Nov. 8, 1938.  F. LEISTER  2,135,902

BEARING

Filed Aug. 24, 1936

INVENTOR
FAYETTE LEISTER
BY
ATTORNEYS

Patented Nov. 8, 1938

2,135,902

UNITED STATES PATENT OFFICE 2,135,902

BEARING

Fayette Leister, Detroit, Mich., assignor to The Fafnir Bearing Company, New Britain, Conn., a corporation of Connecticut Application August 24, 1936, Serial No. 97,487

3 Claims. (Cl. 308—184)

My invention relates to a bearing and more particularly to a bearing mounting for deadening bearing noises.

An object is to provide a sound insulating bearing assembly which is simple in construction, effective in use, and which is durable and will remain serviceable over a long period.

A more specific object is to provide a bearing assembly involving a block of rubber or the like, so supported as to maintain the rubber in shear or tension when subjected to stress imposed by the bearing and the shaft carried thereby.

Other objects and features of invention will be hereinafter pointed out or will become apparent to those skilled in the art.

In the drawing which shows, for illustrative purposes only, a preferred form of the invention—

In said drawing, 5 indicates a support which may be part of a machine frame or other support for carrying the bearing assembly. The bearing assembly is designed to support a shaft 6 which may carry a fan rotor or other device and the bearing assemblies are usually used in pairs. The bearing is preferably an anti-friction bearing including an outer bearing ring 7, and inner bearing ring with interposed anti-friction bearing members such as balls 9. The bearing may be sealed at both sides as by means of seal plates, such as 10. The shaft, as will be understood, is carried in the bore of the inner ring.

Figure 1:
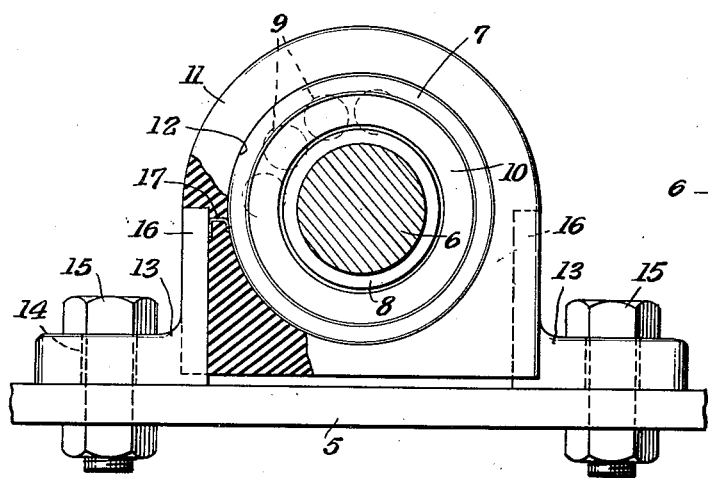
Fig. 1 is an axial view of a shaft bearing assembly, a part being broken away.
Figure 2:
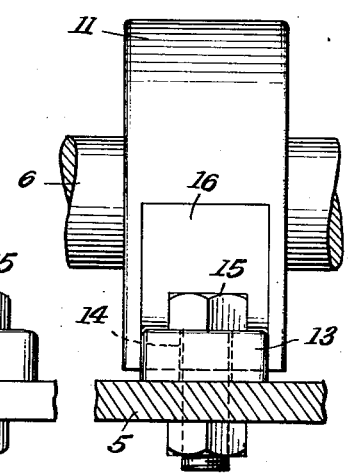
Fig. 2 is a view in elevation taken at right angles to that of Fig. 1.

The bearing is supported in a housing 11 of sound deadening material, preferably a solid block of live rubber. The block may be of generally semi-circular shape, as shown in Fig. 1, and flat on the bottom. The block has a circular bearing recess 12 for receiving the outer bearing ring 7 and the recess may be in the form of a bore extending all the way through the block, or the latter may be provided with edge flanges for supporting the bearing in the recess axially.

My invention relates particularly to the support of the bearing housing 11 in such manner that under stresses of the bearing and shaft the rubber is maintained in shear or tension so as to remain live and not take a cold set after a substantial period as happens in many cases when rubber is maintained under compression. In the form illustrated, the block 12 beneath the bearing is supported adjacent to but out of contact with the support 5, as will be clear from the drawing. For so supporting the block I prefer to employ a pair of foot members, in the form of cast iron angle feet 13—13, one leg of the angle constituting a support and having a bolt hole 14 therethrough for receiving a bolt 15 to secure the foot and associated parts to the support 5, as will be understood. The other leg 16 of the angle is embedded in the rubber block and securely bonded thereto so that the block and feet preferably may be handled as a complete unit.

Normally the stress imparted to the bearing and block 12 by the bearing and shaft 6 carried thereby will be downward with the mounting illustrated. It will be noted that the rubber mounting is in shear or tension where the bearing and shaft stresses imparted to the housing occur. The rubber is thus kept live and resilient and is not likely to take a cold set and lose its resiliency and sound deadening properties.

It will be seen that I have provided a bearing mounting which is of simple form and cheap to manufacture. The entire mounting may be handled as a unit and in use the sound deadening block or housing 11 serves to absorb or deaden the bearing noises so that they will not be transmitted to the foot members nor support 5.

In order to prevent the accumulation of undesirable static charges on the shaft or parts carried thereby I preferably provide a ground connection which may be in the form of a wire 17 connecting the angle leg 16 with the bore in the housing so that the outer ring 7 will engage the same and the static charges will therefore be drawn off to the foot and metallic support.

While the invention has been described in considerable detail and a preferred form shown, it is to be understood that various changes and modifications may be made within the scope of the invention as defined in the appended claims.

I claim:

1. In a device of the character indicated, a bearing housing comprising a unitary block of sound deadening material having a transverse bearing opening therein, a bearing mounted in said transverse opening, supporting feet permanently secured directly to opposite sides of said unitary block of sound deadening material and having means for attachment to a support, said feet being extended beyond said body of sound deadening material in the direction of said support, whereby said body of sound deadening material is maintained out of contact with the support, for the purpose described.

2. In a device of the character indicated, a bearing mounting including a block of resilient rubber having a transverse bearing opening therein, a bearing held in said opening and comprising inner and outer bearing rings with interposed anti-friction bearing members, supporting means permanently and directly secured to said block of rubber at opposite sides thereof for securing said block to a support, said supporting means being extended beyond said block whereby the latter is maintained out of contact with the support, and whereby stresses imparted to said block by said bearing in planes between said supporting means will put parts of said block under tension and shear strains.

3. In a device of the character indicated, a bearing mounting comprising a block of resilient rubber having a transverse bearing opening therein, a bearing mounted in said opening and comprising inner and outer bearing rings with interposed anti-friction bearing members, a pair of angle feet permanently bonded directly to said rubber block at opposite sides thereof and extending beyond the end thereof, whereby said angle feet will maintain said block out of contact with a support abutting said feet, whereby stresses imparted to said rubber block by said bearing in planes between said angular feet will put parts of said block under tension and shear strains.

FAYETTE LEISTER.